(12) United States Patent
Fujimura et al.

(10) Patent No.: US 6,668,587 B2
(45) Date of Patent: Dec. 30, 2003

(54) METHOD FOR THE PRODUCTION OF GLASS SUBSTRATES FOR MAGNETIC RECORDING MEDIUMS

(75) Inventors: Akio Fujimura, Saitama (JP); Daisaku Kobayashi, Saitama (JP)

(73) Assignee: Mitsui Mining and Smelting Co., Ltd., Tokyo (JP)

( * ) Notice: Subject to any disclaimer, the term of this patent is extended or adjusted under 35 U.S.C. 154(b) by 215 days.

(21) Appl. No.: 09/863,297

(22) Filed: May 24, 2001

(65) Prior Publication Data

US 2002/0000098 A1 Jan. 3, 2002

(30) Foreign Application Priority Data

May 26, 2000 (JP) ........................................ 2000-156429

(51) Int. Cl.$^7$ .......................... C03C 19/00; C03C 21/00
(52) U.S. Cl. .......................... 65/30.14; 65/31; 65/33.1; 65/61; 134/2; 134/4; 134/7; 134/42
(58) Field of Search ........................ 65/30.14, 31, 33.1, 65/61; 134/2, 3, 4, 7, 42

(56) References Cited

U.S. PATENT DOCUMENTS

| 6,069,770 | A | * | 5/2000 | Cui et al. ................... 510/175 |
|---|---|---|---|---|
| 6,114,039 | A | * | 9/2000 | Rifqi ........................... 428/410 |
| 6,119,483 | A | * | 9/2000 | Takahashi et al. .......... 65/30.14 |
| 6,312,759 | B1 | * | 11/2001 | Yamada et al. .............. 427/131 |
| 6,428,715 | B1 | * | 8/2002 | Abels et al. .................. 216/22 |

FOREIGN PATENT DOCUMENTS

| JP | 3-52130 | 3/1991 |
|---|---|---|
| JP | 7-134823 | 5/1995 |
| JP | 8-124153 | 5/1996 |

* cited by examiner

*Primary Examiner*—Sean Vincent
(74) *Attorney, Agent, or Firm*—Young & Thompson

(57) ABSTRACT

A method for the production of a glass substrate for magnetic recording mediums is herein provided and this method is characterized in that the final cleaning step is performed in two stages, in which scrubbing and dip-cleaning steps are carried out after the completion of the first cleaning stage and after the growth of needle-like projections comprising an alkali metal carbonate on the surface of the glass substrate. The method for the production of a glass substrate for magnetic recording mediums does not require the use of an expensive device having high resistance to acids. Moreover, in the glass substrate for magnetic recording mediums produced by the foregoing method, any growth of needle-like projections containing an alkali metal carbonate on the surface of the glass substrate is inhibited even during temporal storage of the substrate.

12 Claims, No Drawings

METHOD FOR THE PRODUCTION OF GLASS SUBSTRATES FOR MAGNETIC RECORDING MEDIUMS

BACKGROUND OF THE INVENTION

1. Field of the Invention

The present invention relates to a method for the production of a glass substrate for magnetic recording mediums and more particularly to a method for the production of a glass substrate for magnetic recording mediums, which can inhibit the formation of any needle-like projection containing an alkali metal carbonate on the surface of the glass substrate.

2. Description of the Prior Art

There has been desired for the reduction of the magnetic head's flying height of a magnetic disk-recording device in order to improve the recording density of a magnetic recording disk, as the storage capacity of the magnetic disk-recording device has increasingly been high. To reduce the flying height of the head, there has been desired for the development of a substrate for magnetic recording mediums, which is excellent in the surface smoothness, has only a small amount of deposits on the surface thereof and has a substantially small quantity of surface defects.

As the conventional substrates for magnetic recording mediums excellent in the surface smoothness, there have mainly been used those each prepared by plating an aluminum alloy plate with Ni—P and then polishing the plated main surface of the plate in a multiple step process.

However, the magnetic disk-recording device has recently been adopted even in the portable personal computer such as notebook-sized personal computers and the magnetic recording medium should be rotated at a high speed on the order of not less than 10,000 rpm in order to improve the response speed of the magnetic disk-recording device. For this reason, there has been desired for the development of a substrate for magnetic disk-recording mediums having high strength capable of withstanding such severe conditions. As such a substrate, which can satisfy the foregoing requirements, there has been adopted a glass substrate.

Such a mainly adopted glass substrate for magnetic recording mediums includes, for instance, a chemically strengthened glass substrate whose strength is improved by a chemical strengthening treatment or a crystallized glass substrate prepared by melting and molding glass to give a glass substrate, and maintaining the glass substrate at a high temperature ranging from 600 to 800° C. over a long period of time to thus partially separate out crystalline phases in the substrate.

The chemically strengthened glass substrate is, for instance, one obtained by melting a glass material and forming the melt into a glass substrate for chemically strengthened glass substrates, then subjecting the glass substrate to grinding and polishing treatments, and immersing it into a molten salt of, for instance, sodium nitrate or potassium nitrate to form a compression stressed layer on the surface thereof and to thus improve the breaking strength thereof and therefore, the surface layer of the resulting substrate necessarily has a high content of alkali metals. In addition, some of the crystallized glass substrates comprise alkali metals, in particular, lithium.

In general, the production of a glass substrate for magnetic recording mediums and the formation of, for instance, a magnetic recording layer and a protective layer are carried out at separate places or in separate factories. Therefore, the glass substrate for magnetic recording mediums is cleaned by a well known cleaning method such as a cleaning method comprising a combination of scrub-cleaning, which makes use of a sponge roller, and ultrasonic cleaning and then dried prior to the transportation thereof to another place or factory. Therefore, the glass substrates are temporarily stored before and/or after the transportation.

In case of the foregoing glass substrate for magnetic recording mediums consisting of a chemically strengthened glass substrate or a crystallized glass substrate containing, for instance, lithium, however, an infinite number of needle-like projections grow on the surface of the glass substrate within 24 hours after the foregoing cleaning operations. If the glass surface is observed with an atomic force microscope (AFM) while expanding the longitudinal magnification, these projections look like just spikes of spiked shoes. If a magnetic recording medium is prepared using a glass substrate for magnetic recording mediums having such needle-like projections, the resulting magnetic recording medium may come in contact with the magnetic head of a magnetic recording device during writing and/or reading due to the presence of these needle-like projections depending on the height thereof and this may accordingly interfere with the reduction of the flying height of the magnetic head. As a result of the elemental analysis, it is confirmed that the needle-like projections mainly comprise carbonates of alkali metals such as Na, K and Li, which may, by nature, be present in the glass or may be introduced into the glass substrate through the chemical strengthening. More specifically, it would be recognized that these metal ions present near the surface area of the glass substrate after the completion of the cleaning operations move towards the surface with the elapse of time, while they react with $CO_2$ present in the air to form carbonates and that the carbonates grow and are deposited on the surface in the form of needle-like projections.

In the conventional method for preparing a glass substrate, an acid cleaning step is added to the cleaning process to eliminate the foregoing problem. As such acids used in the acid cleaning step, there may be listed, for instance, inorganic acids such as hydrofluoric acid, hydrochloric acid, sulfuric acid and phosphoric acid; organic acids such as formic acid, oxalic acid, citric acid, tartaric acid and hydroxyacetic acid. Thus, the addition of such an acid cleaning step would permit the reduction of the alkali metal ion concentration in the proximity of the surface of the glass substrate and the reduction of the amount of such deposits of carbonates.

However, effective acid cleaning requires quite severe conditions such as a high temperature and a high acid concentration. For this reason, such an acid cleaning requires the use of an expensive apparatus having high resistance to acids and sufficient care should be taken to ensure safety.

SUMMARY OF THE INVENTION

Accordingly, there has presently been desired for the development of a simpler cleaning method, which can inhibit the growth of needle-like projections mainly comprising an alkali metal carbonate. Thus, it is an object of the present invention to provide a method for the production of a glass substrate for magnetic recording mediums, which can inhibit the formation of any needle-like projection mainly comprising an alkali metal carbonate on the surface of the glass substrate.

The inventors of this invention have conducted various studies to solve the foregoing problems associated with the conventional methods, have found that, after the cleaning step when a glass substrate is subjected to disk-processing, grinding, polishing and subsequent cleaning steps as well as a chemical strengthening step carried out between the grinding and polishing steps, or between the first and second polishing stages when the polishing step is stepwise carried out in two stages, or between the polishing and subsequent cleaning steps according to a conventionally well-known method; or after the cleaning step when the glass substrate is subjected to a chemical strengthening step between the polishing and cleaning steps; or after the cleaning step when a crystallized glass substrate is subjected to disk-processing, grinding, polishing and subsequent cleaning steps, if a glass substrate is allowed to stand in the air for 48 hours to thus sufficiently form, on the surface thereof, needle-like projections comprising an alkali metal carbonate and then subjected to scrub-cleaning using a sponge roller or the like and dip-cleaning, any fresh needle-like projection is not formed any more from the glass substrate after the cleaning step, and thus have completed the present invention.

According to the present invention, there is thus provided a method for the production of a glass substrate for magnetic recording mediums, which is characterized in that the final cleaning step is performed in two stages, in which as the second cleaning stage, scrubbing and dip-cleaning steps are carried out after the completion of the first cleaning stage and after the growth of needle-like projections comprising an alkali metal carbonate on the surface of the glass substrate.

DETAILED DESCRIPTION OF THE INVENTION

The method for the production of a glass substrate for magnetic recording mediums according to the present invention will be described in more detail below. The production method of the present invention suitably be applied, in particular, to the production of a chemically strengthened glass substrate, but may likewise effectively be applied to the production of a crystallized glass substrate containing an alkali metal such as lithium, as well.

According to a first embodiment of the present invention, there is provided a method for the production of a chemically strengthened glass substrate for magnetic recording mediums, which comprises disk-processing, grinding, polishing and subsequent cleaning steps as well as a chemical strengthening step carried out between the grinding and polishing steps, or between the first and second polishing stages when the polishing step is stepwise carried out in two stages, or between the polishing and subsequent cleaning steps, the method being characterized in that it further comprises the steps of scrub-cleaning and dip-cleaning the glass substrate and then drying the same, after the completion of the foregoing cleaning step and after the growth of needle-like projections comprising an alkali metal carbonate on the surface of the glass substrate.

According to a second embodiment of the present invention, there is provided a method for the production of a crystallized glass substrate for magnetic recording mediums, which comprises the steps of disk-processing, grinding, polishing and subsequent cleaning, the method being characterized in that it further comprises the steps of scrub-cleaning and dip-cleaning the glass substrate and then drying the same, after the completion of the foregoing cleaning step and after the growth of needle-like projections comprising an alkali metal carbonate on the surface of the glass substrate.

The disk-processing, grinding, polishing and cleaning steps as described above are disclosed in, for instance, Japanese Examined Patent Publication No. Hei 3-52130 and Japanese Un-Examined Patent Publication Nos. Hei 7-134823 and Hei 8-124153 and these well-known techniques can be used in the production method according to the present invention without any modification. Moreover, almost the same effects can be ensured even if the chemical strengthening step is carried out in any of the foregoing three stages, i.e., between the grinding and polishing steps, between the first and second stages when the polishing step is performed in two stages, and between the polishing step and the subsequent cleaning step.

The glass substrate for magnetic recording mediums, which has been subjected to, for instance, disk-processing, grinding, polishing and chemical strengthening steps according to the usual techniques, is subjected to scrub-cleaning, which makes use of a sponge roller or a sponge disk and which is the usual cleaning step for the glass substrate for magnetic recording mediums, the glass substrate is then subjected to multi-stage dipping in an ultra-pure water bath under the application of ultrasonics to remove the contaminants on the surface thereof and finally the glass substrate is dried using an alcohol.

If the glass substrate cleaned according to these commonly used cleaning steps (in particular, the chemically strengthened glass substrate) is allowed to stand over about 24 hours in the air, needle-like projections containing an alkali metal carbonate grow on the surface of the glass substrate. The density of the needle-like projections increases as the time further proceeds and it is recognized that the growth of the needle-like projections reaches its upper limit (growth saturation) after about 48 hours although the time required for arriving at such a growth limit may vary depending on the temperature and humidity of the air.

Therefore, in case where it is desired to substantially shorten the time required for the production of the glass substrate for magnetic recording mediums by accelerating the growth of the needle-like projections and the saturation of the growth thereof and carrying out the subsequent scrub-cleaning and dip-cleaning as well as drying in earlier stage, it is preferred to maintain the glass substrate after the cleaning in an environment whose $CO_2$ gas concentration is several percentages under high temperature and humidity conditions.

If the growth of the needle-like projections containing an alkali metal carbonate reaches it's saturation point and then the glass substrate is again subjected to scrub-cleaning and dip-cleaning, and then dried, the re-cleaned glass substrate is never accompanied by further growth of needle-like projections on the surface thereof even if the re-cleaned substrate is allowed to stand in the air over a long period of time. The reason of this would be considered that most of the alkali metals such as Na, K and Li present in the proximity of the surface of the glass substrate move towards the surface thereof, react with $CO_2$ in the air to form carbonates thereof and to deposit thereon in the form of needle-like projections and that any alkali metal required for further deposition does not exist any more in the proximity of the surface thereof after the re-cleaning of the glass substrate.

Incidentally, the usual scrub-cleaning procedure cannot completely remove the needle-like projections and therefore, a small amount of projections would still remain on the surface of the glass substrate.

Accordingly, it is preferred that the cleaning with a sponge roller or a sponge disk be carried out in the coexistence of a small amount of a slurry of a fine particulate abrasive in order to improve the effect of the scrub-cleaning and in this case, there has been observed considerable improvement of the effect. Materials for such a fine particulate abrasive usable herein are, for instance, magnesium hydroxide, inorganic oxide and carbonates such as manganese oxide, cerium oxide and calcium carbonate.

The present invention will hereunder be described in more detail with reference to the following Examples and Comparative Examples, but the present invention is not restricted to these specific Examples at all.

COMPARATIVE EXAMPLE 1

An aluminosilicate glass substrate capable of being chemically strengthened (AH-1, available from Asahi Techno Glass Corporation) was subjected to inner and outer diameter processing according to the usual procedures for the production of a chemically strengthened glass substrate for magnetic recording mediums and then a lapping step (grinding step) to thus form a large number of doughnut-like substrates having an outer diameter of 65 mm, an inner diameter of 20 mm and a thickness of 0.68 mm. Then these glass substrates were immersed in a mixed molten salt containing potassium nitrate (70% by mass) and sodium nitrate (30% by mass) maintained at 380° C. for one hour to thus chemically strengthen them in such a manner that the thickness of the strengthening layer reached 60 $\mu$m.

The chemically strengthened glass substrates (100 sheets) were fitted to a 16B both side polishing machine available from Hamai Co., Ltd. to thus polish these glass substrates using Mirek 801 available from Mitsui Mining and Smelting Co., Ltd ($CeO_2$ type abrasive; average particle size $D_{5\ 0}$=1.5 $\mu$m) as an abrasive and MHC 15A (foamed urethane) available from Rodel Nitta Co., Ltd. as an abrasion cloth so that the reduced thickness of the glass substrate was equal to 15 $\mu$m per side or face (first polishing stage).

The glass substrates (100 sheets) thus polished above were likewise fitted to a 16B both side polishing machine available from Hamai Co., Ltd. and the both sides of the substrates were then polished using an abrasive liquid containing 0.5% by mass of CEP available from Mitsui Mining and Smelting Co., Ltd. (a solid solution comprising 100 parts by mass of cerium oxide and one part by mass of silicon oxide; average particle size $D_{5\ 0}$=0.2 $\mu$m) as an abrasive and MHC 14E (foamed urethane) available from Rodel Nitta Co., Ltd. as an abrasion cloth, under the conditions of an abrasion pressure of 60 g/cm$^2$, a rotational number of 30 rpm and an abrasion time of 20 minutes (second polishing stage).

The glass substrates polished above were scrub-cleaned over 3 steps (for 3 seconds per step) using a cleaning device for glass substrates available from Speed Pham Co., Ltd. and a sponge disk available from Kanebo Ltd. Then, these glass substrates were subjected to dip-cleaning using SPC 397 (weak alkaline cleaning agent) available from Kyodo Fats & Oils Co., Ltd. as a cleaning agent, followed by rinsing, in order, in 5 baths under the application of ultrasonics using ultra-pure water. Then the glass substrates were immersed in isopropyl alcohol and thereafter dried in the isopropyl alcohol vapor.

The surface roughness values (arithmetically averaged roughness Ra and maximum height Ry) of the chemically strengthened glass substrate after the cleaning operations were determined, for an area of 2 $\mu$m×2 $\mu$m, using AFM immediately after the cleaning and after allowing them to stand in a room (temperature ranging from 20 to 25° C.; humidity ranging from 50 to 70%) over 12 hours, 24 hours and 48 hours. The results thus obtained are summarized in the following Table 1.

TABLE 1

|  | Ra (Å) | Ry (Å) |
| --- | --- | --- |
| Immediately After Cleaning | 1.8 | 25 |
| After 12 Hours from Cleaning | 2.7 | 100 |
| After 24 Hours from Cleaning | 5.4 | 135 |
| After 48 Hours from Cleaning | 6.6 | 130 |

EXAMPLE 1

An aluminosilicate glass substrate (AH-1, available from Asahi Techno Glass Corporation) was subjected to disk-processing, grinding, chemical strengthening, polishing and cleaning steps according to the same procedures used in Comparative Example 1. After the cleaning step and after allowing them to stand in a room (temperature ranging from 20 to 25° C.; humidity ranging from 50 to 70%) over 48 hours, the glass substrates were again subjected to 3 step-scrub-cleaning (for 3 seconds per step) using a cleaning device for glass substrates available from Speed Pham Co., Ltd. and a sponge disk available from Kanebo Ltd. Then the substrates were dip-cleaned using RBS as a cleaning agent, followed by rinsing, in order, in 5 baths under the application of ultrasonics using ultra-pure water. Then the glass substrates were immersed in isopropyl alcohol and thereafter dried in the isopropyl alcohol vapor.

The surface roughness values (Ra and Ry) of the chemically strengthened glass substrates after the re-cleaning operations were determined, for an area of 2 $\mu$m×2 $\mu$m, using AFM immediately after the cleaning and after allowing the substrates to stand in a room (temperature ranging from 20 to 25° C.; humidity ranging from 50 to 70%) over 12 hours, 24 hours and 48 hours. The results thus obtained are listed in the following Table 2.

TABLE 2

|  | Ra (Å) | Ry (Å) |
| --- | --- | --- |
| Immediately After Cleaning | 2.7 | 60 |
| After 12 Hours from Cleaning | 3.0 | 65 |
| After 24 Hours from Cleaning | 3.4 | 65 |
| After 48 Hours from Cleaning | 3.2 | 63 |

EXAMPLE 2

An aluminosilicate glass substrate (AH-1, available from Asahi Techno Glass Corporation) was subjected to disk-processing, grinding, chemical strengthening, polishing and cleaning steps according to the same procedures used in Comparative Example 1. After the cleaning step and after allowing the substrates to stand in a room (temperature ranging from 20 to 25° C.; humidity ranging from 50 to 70%) over 48 hours, the glass substrates were again subjected to 3 step-scrub-cleaning (for 3 seconds per step) using a cleaning device for glass substrates available from Speed Pham Co., Ltd. and a sponge disk available from Kanebo Ltd. and an abrasive liquid containing 0.5% by mass of CEP available from Mitsui Mining and Smelting Co., Ltd. Then the substrates were dip-cleaned using RBS as a cleaning agent, followed by rinsing, in order, in 5 baths under the application of ultrasonics using ultra-pure water. Then the glass substrates were immersed in isopropyl alcohol and thereafter dried in the isopropyl alcohol vapor.

The surface roughness values (Ra and Ry) of the chemically strengthened glass substrate after the re-cleaning operations were determined, for an area of 2 μm×2 μm, using AFM immediately after the cleaning and after allowing the substrates to stand in a room (temperature ranging from 20 to 25° C.; humidity ranging from 50 to 70%) over 12 hours, 24 hours and 48 hours. The results thus obtained are listed in the following Table 3.

TABLE 3

|  | Ra (Å) | Ry (Å) |
| --- | --- | --- |
| Immediately After Cleaning | 1.6 | 26 |
| After 12 Hours from Cleaning | 1.6 | 24 |
| After 24 Hours from Cleaning | 2.0 | 25 |
| After 48 Hours from Cleaning | 1.8 | 24 |

EXAMPLE 3

An aluminosilicate glass substrate (AH-1, available from Asahi Techno Glass Corporation) was subjected to disk-processing, grinding, chemical strengthening, polishing and cleaning steps according to the same procedures used in Comparative Example 1, except that the chemical strengthening step was not carried out between the grinding and polishing steps, but between the first and second polishing stages. After the cleaning step and after allowing the substrates to stand in a room (temperature ranging from 20 to 25° C.; humidity ranging from 50 to 70%) over 48 hours, the glass substrates were again subjected to 3 step-scrub-cleaning (for 3 seconds per step) using a cleaning device for glass substrates available from Speed Pham Co., Ltd. and a sponge disk available from Kanebo Ltd. and an abrasive liquid containing 0.5% by mass of CEP available from Mitsui Mining and Smelting Co., Ltd. Then the substrates were dip-cleaned using RBS as a cleaning agent, followed by rinsing, in order, in 5 baths under the application of ultrasonics using ultra-pure water. Then the glass substrates were immersed in isopropyl alcohol and thereafter dried in the isopropyl alcohol vapor.

The surface roughness values (Ra and Ry) of the chemically strengthened glass substrate after the re-cleaning operations were determined, for an area of 2 μm×2 μm, using AFM immediately after the cleaning and after allowing to stand them in a room (temperature ranging from 20 to 25° C.; humidity ranging from 50 to 70%) over 12 hours, 24 hours and 48 hours. The results thus obtained are listed in the following Table 4.

TABLE 4

|  | Ra (Å) | Ry (Å) |
| --- | --- | --- |
| Immediately After Cleaning | 1.6 | 25 |
| After 12 Hours from Cleaning | 1.7 | 25 |
| After 24 Hours from Cleaning | 2.0 | 26 |
| After 48 Hours from Cleaning | 1.9 | 27 |

EXAMPLE 4

An aluminosilicate glass substrate (AH-1, available from Asahi Techno Glass Corporation) was subjected to disk-processing, grinding, chemical strengthening, polishing and cleaning steps according to the same procedures used in Comparative Example 1 except that the chemical strengthening step was not carried out between the grinding and polishing steps, but between the second polishing stage and the cleaning step. After the cleaning step and after allowing the substrates to stand in a room (temperature ranging from 20 to 25° C.; humidity ranging from 50 to 70%) over 48 hours, the glass substrates were again subjected to 3 step-scrub-cleaning (for 3 seconds per step) using a cleaning device for glass substrates available from Speed Pham Co., Ltd. and a sponge disk available from Kanebo Ltd. and an abrasive liquid containing 0.5% by mass of CEP available from Mitsui Mining and Smelting Co., Ltd. Then the substrates were dip-cleaned using RBS as a cleaning agent, followed by rinsing, in order, in 5 baths under the application of ultrasonics using ultra-pure water. Then the glass substrates were immersed in isopropyl alcohol and thereafter dried in the isopropyl alcohol vapor.

The surface roughness values (Ra and Ry) of the chemically strengthened glass substrates after the re-cleaning operations were determined, for an area of 2 μm×2 μm, using AFM immediately after the cleaning and after allowing the substrates to stand in a room (temperature ranging from 20 to 25° C.; humidity ranging from 50 to 70%) over 12 hours, 24 hours and 48 hours. The results thus obtained are listed in the following Table 5.

TABLE 5

|  | Ra (Å) | Ry (Å) |
| --- | --- | --- |
| Immediately After Cleaning | 1.7 | 28 |
| After 12 Hours from Cleaning | 1.8 | 27 |
| After 24 Hours from Cleaning | 2.1 | 27 |
| After 48 Hours from Cleaning | 2.0 | 26 |

EXAMPLE 5 TO 12

Aluminosilicate glass substrates (AH-1, available from Asahi Techno Glass Corporation) were subjected to disk-processing, grinding, chemical strengthening, polishing and cleaning steps according to the same procedures used in Comparative Example 1. After the cleaning step and after allowing them to stand in the atmosphere maintained at the temperature, humidity and $CO_2$ concentration as specified in the following Table 6 for the time likewise specified in Table 6, the glass substrates were again subjected to 3 step-scrub-cleaning (for 3 seconds per step) using a cleaning device for glass substrates available from Speed Pham Co., Ltd. and a sponge disk available from Kanebo Ltd. and an abrasive liquid containing 0.5% by mass of CEP available from Mitsui Mining and Smelting Co., Ltd. Then the substrates were dip-cleaned using RBS as a cleaning agent, followed by rinsing, in order, in 5 baths under the application of ultrasonics using ultra-pure water. Then the glass substrates were immersed in isopropyl alcohol and thereafter dried in the isopropyl alcohol vapor.

The surface roughness values (Ra and Ry) of the chemically strengthened glass substrates after the re-cleaning operations were determined, for an area of 2 μm×2 μm, using AFM after the cleaning and after allowing to stand them in a room (temperature ranging from 20 to 25° C.; humidity ranging from 50 to 70%) over 48 hours. The results thus obtained are listed in the following Table 6.

TABLE 6

| Ex. No. | Temp. | Humidity | CO$_2$ Conc. % by volume | Time hr | Ra Å | Ry Å |
|---|---|---|---|---|---|---|
| 5 | 50° C. | 50% | 0.5 | 1 | 2.0 | 29 |
| 6 | 50° C. | 80% | 0.5 | 10 | 1.9 | 27 |
| 7 | 80° C. | 50% | 0.5 | 1 | 1.9 | 28 |
| 8 | 80° C. | 80% | 0.5 | 10 | 1.8 | 27 |
| 9 | 50° C. | 50% | 5 | 1 | 1.8 | 25 |
| 10 | 50° C. | 80% | 5 | 10 | 1.7 | 24 |
| 11 | 80° C. | 50% | 5 | 1 | 1.7 | 25 |
| 12 | 80° C. | 80% | 5 | 10 | 1.6 | 23 |

COMPARATIVE EXAMPLE 2

The same procedures used in Comparative Example 1 were repeated except that a lithium silicate crystallized glass substrate (TS-10SX, available from K. K. OHARA; comprising 70 to 80% of quartz-cristobalite and the balance of amorphous glass phase) was substituted for the aluminosilicate glass substrate and that any chemical strengthening step was not carried out. The surface roughness values (Ra and Ry) of the glass substrate after the cleaning operations were determined, for an area of 2 μm×2 μm, using AFM immediately after the cleaning and after allowing them to stand in a room (temperature ranging from 20 to 25° C.; humidity ranging from 50 to 70%) over 12 hours, 24 hours and 48 hours. The results thus obtained are listed in the following Table 7.

TABLE 7

|  | Ra (Å) | Ry (Å) |
|---|---|---|
| Immediately After Cleaning | 2.4 | 23 |
| After 12 Hours from Cleaning | 2.6 | 38 |
| After 24 Hours from Cleaning | 3.0 | 52 |
| After 48 Hours from Cleaning | 3.2 | 54 |

EXAMPLE 13

The same procedures used in Example 2 were repeated except that a lithium silicate crystallized glass substrate (TS-10SX, available from K. K. OHARA; comprising 70 to 80% of quartz-cristobalite and the balance of amorphous glass phase) was substituted for the aluminosilicate glass substrate and that any chemical strengthening step was not carried out.

The surface roughness values (Ra and Ry) of the chemically strengthened glass substrate after the re-cleaning operations were determined, for an area of 2 μm×2 μm, using AFM after the cleaning and after allowing the substrates to stand in a room (temperature ranging from 20 to 25° C.; humidity ranging from 50 to 70%) over 48 hours. The results thus obtained are listed in the following Table 8.

TABLE 8

|  | Ra (Å) | Ry (Å) |
|---|---|---|
| Immediately After Cleaning | 2.5 | 35 |
| After 48 Hours from Cleaning | 2.7 | 33 |

As has been discussed above in detail, the method for the production of a glass substrate for magnetic recording mediums according to the present invention does not require the use of an expensive device having high resistance to acids. Moreover, in the glass substrate for magnetic recording mediums produced by the method of the present invention, any growth of needle-like projections containing an alkali metal carbonate on the surface of the glass substrate can be inhibited even during temporal storage of the substrate.

What is claimed is:

1. A method for the production of a glass substrate for magnetic recording mediums, characterized in that the final cleaning step is performed in two stages, in which as the second cleaning stage, scrubbing and dip-cleaning steps are carried out after the completion of the first cleaning stage and after the growth of needle-like projections comprising an alkali metal carbonate on the surface of the glass substrate.

2. The method for the production of a glass substrate for magnetic recording mediums as set forth in claim 1, which comprises disk-processing, grinding, polishing and subsequent cleaning steps as well as a chemical strengthening step carried out between the grinding and polishing steps, or between the first and second polishing stages when the polishing step is stepwise carried out in two stages, or between the polishing and subsequent cleaning steps, the method being characterized in that it further comprises the steps of scrub-cleaning and dip-cleaning the glass substrate and then drying the same, after the completion of the foregoing cleaning step and after the growth of needle-like projections comprising an alkali metal carbonate on the surface of the glass substrate.

3. The method for the production of a crystallized glass substrate for magnetic recording mediums as set forth in claim 1, which comprises the steps of disk-processing, grinding, polishing and subsequent cleaning, the method being characterized in that it further comprises the steps of scrub-cleaning and dip-cleaning the glass substrate and then drying the same, after the completion of the foregoing cleaning step and after the growth of needle-like projections comprising an alkali metal carbonate on the surface of the glass substrate.

4. The method for the production of a crystallized glass substrate for magnetic recording mediums as set forth in claim 1, wherein the growth of the needle-like projections is accelerated.

5. The method for the production of a crystallized glass substrate for magnetic recording mediums as set forth in claim 2, wherein the growth of the needle-like projections is accelerated.

6. The method for the production of a crystallized glass substrate for magnetic recording mediums as set forth in claim 3, wherein the growth of the needle-like projections is accelerated.

7. The method for the production of a crystallized glass substrate for magnetic recording mediums as set forth in claim 1, wherein the scrub-cleaning as the second cleaning stage is carried out in the presence of a slurry of a fine particulate abrasive.

8. The method for the production of a crystallized glass substrate for magnetic recording mediums as set forth in claim 2, wherein the scrub-cleaning as the second cleaning stage is carried out in the presence of a slurry of a fine particulate abrasive.

9. The method for the production of a crystallized glass substrate for magnetic recording mediums as set forth in claim 3, wherein the scrub-cleaning as the second cleaning stage is carried out in the presence of a slurry of a fine particulate abrasive.

10. The method for the production of a crystallized glass substrate for magnetic recording mediums as set forth in claim 4, wherein the scrub-cleaning as the second cleaning stage is carried out in the presence of a slurry of a fine particulate abrasive.

11. The method for the production of a crystallized glass substrate for magnetic recording mediums as set forth in claim 5, wherein the scrub-cleaning as the second cleaning stage is carried out in the presence of a slurry of a fine particulate abrasive.

12. The method for the production of a crystallized glass substrate for magnetic recording mediums as set forth in claim 6, wherein the scrub-cleaning as the second cleaning stage is carried out in the presence of a slurry of a fine particulate abrasive.

* * * * *